US007179440B2

(12) United States Patent
Escrig et al.

(10) Patent No.: US 7,179,440 B2
(45) Date of Patent: Feb. 20, 2007

(54) PROCESS TO OBTAIN HYDROGEN PEROXIDE

(75) Inventors: Pilar De Frutos Escrig, Madrid (ES); Jose Miguel Campos Martin, Madrid (ES); Jose Luis Garcia Fierro, Madrid (ES); Encapnacion Cano Serrano, Getafe (ES); Gema Blanco Brieva, Alcorcon (ES)

(73) Assignee: Repsol Quimica, S.A., Madrid (ES)

( * ) Notice: Subject to any disclaimer, the term of this patent is extended or adjusted under 35 U.S.C. 154(b) by 109 days.

(21) Appl. No.: 10/389,695

(22) Filed: Mar. 13, 2003

(65) Prior Publication Data

US 2003/0215383 A1 Nov. 20, 2003

(30) Foreign Application Priority Data

Mar. 14, 2002 (EP) ................. 02380057

(51) Int. Cl.
*C01B 15/029* (2006.01)
(52) U.S. Cl. .................................... 423/584
(58) Field of Classification Search ............... 423/584
See application file for complete search history.

(56) References Cited

U.S. PATENT DOCUMENTS

| 2,479,111 | A | | 8/1949 | Harris ..................... 23/207 |
|---|---|---|---|---|
| 2,869,989 | A | | 1/1959 | Keeler et al. ............... 23/207 |
| 2,871,102 | A | | 1/1959 | Rust et al. ................. 23/207 |
| 2,871,103 | A | | 1/1959 | Skinner et al. ............. 23/207 |
| 2,871,104 | A | | 1/1959 | Rust ......................... 23/207 |
| 3,156,531 | A | | 11/1964 | Luten, Jr. et al. ........... 23/207 |
| 3,294,488 | A | | 12/1966 | Dunlop et al. .............. 23/207 |
| 4,007,256 | A | * | 2/1977 | Kim et al. ................. 423/584 |
| 4,303,632 | A | | 12/1981 | Gosser ..................... 423/591 |
| 4,681,751 | A | | 7/1987 | Gosser ..................... 423/584 |
| 4,701,428 | A | | 10/1987 | Bellussi et al. .............. 502/8 |
| 4,772,458 | A | * | 9/1988 | Gosser et al. .............. 423/584 |
| 4,824,976 | A | | 4/1989 | Clerici et al. .............. 549/531 |
| 4,832,938 | A | | 5/1989 | Gosser et al. .............. 423/584 |
| 4,897,252 | A | | 1/1990 | Cochran et al. ............ 423/591 |
| 4,937,216 | A | | 6/1990 | Clerici et al. ................ 502/62 |
| 4,975,266 | A | | 12/1990 | Albal et al. ................ 423/591 |
| 5,082,647 | A | * | 1/1992 | Chuang ..................... 423/584 |
| 5,132,099 | A | * | 7/1992 | Hiramatsu et al. .......... 423/584 |
| 5,135,731 | A | * | 8/1992 | Gosser et al. .............. 423/584 |
| 5,166,372 | A | | 11/1992 | Crocco et al. .............. 549/531 |
| 5,214,168 | A | | 5/1993 | Zajacek et al. ............. 549/531 |
| 5,254,326 | A | | 10/1993 | Leyshon et al. ............ 423/591 |
| 5,338,531 | A | | 8/1994 | Chuang et al. ............. 423/584 |
| 5,378,450 | A | * | 1/1995 | Tomita et al. .............. 423/584 |
| 5,399,334 | A | * | 3/1995 | Kawakami et al. .......... 423/584 |
| 5,912,367 | A | | 6/1999 | Chang ....................... 549/529 |
| 5,968,472 | A | | 10/1999 | Oyague et al. ............. 423/591 |
| 6,168,775 | B1 | | 1/2001 | Zhou et al. ................. 423/584 |
| 6,284,213 | B1 | * | 9/2001 | Paparatto et al. ............ 423/403 |
| 6,387,346 | B1 | | 5/2002 | Bertsch-Frank et al. ..... 423/584 |
| 6,500,968 | B2 | | 12/2002 | Zhou et al. ................. 549/531 |
| 6,630,118 | B2 | * | 10/2003 | Paparatto et al. ........... 423/584 |
| 6,822,103 | B2 | * | 11/2004 | Escrig et al. ............... 549/531 |
| 2001/0016187 | A1 | | 8/2001 | Zhou et al. ................. 423/582 |

FOREIGN PATENT DOCUMENTS

| CA | 560133 | | 7/1958 | |
|---|---|---|---|---|
| EP | 0 378 388 A1 | | 7/1990 | |
| EP | 0 492 064 A1 | | 9/1991 | |
| EP | 0 504 741 A1 | | 9/1992 | |
| EP | 0 978 316 A1 | | 2/2000 | |
| EP | 1 074 548 A1 | | 2/2001 | |
| GB | 758907 | | 10/1956 | |
| GB | 759464 | | 10/1956 | |
| JP | 4-357105 | * | 12/1992 | ............. 423/584 |
| WO | 94/23834 A1 | | 10/1994 | |
| WO | 99/41190 A1 | | 8/1999 | |
| WO | 99/48884 A1 | | 9/1999 | |
| WO | 01/05498 A1 | | 1/2001 | |
| WO | 01/05501 A1 | | 1/2001 | |

OTHER PUBLICATIONS

U.S. Office Action for U.S. Appl. No. 08/960,857 (Date: Aug. 12, 1998; No. of pp.: 5), which is related by subject matter to the above-identified U.S. Appl. No. 10/389,695.
U.S. Office Action for U.S. Appl. No. 08/960,857 (Date: Mar. 25, 1999; No. of pp.: 4), which is related by subject matter to the above-identified U.S. Appl. No. 10/389,695.
Letters ("Handling Hazardous Chemicals," "Nominal and Actual Molarity," & "Thanks to Younger Chemists") *Chemical and Engineering News*, p. 4 (Jan. 7, 1985).
MacKenzie, J., "Hydrogen Peroxide Without Accidents," *Chemical Engineering*, pp. 84-90 (Jun. 1990).
Milas, N.A., et al., "Studies in Organic Peroxides. XXVI. Organic Peroxides Derived from Acetone and Hydrogen Peroxide," *J. Am. Chem. Soc.*, vol. 81, pp. 6461-6462 (1959), no month.
Schwoegler, E.J., Letter entitled "Shock Sensitivity of Acetone Peroxides," *Chemical and Engineering News*, p. 4, (Jan. 7, 1985).
Swern, D., ed., Organic Peroxides, vol. 1, New York, Wiley-Interscience, p. 26, no date.
U.S. Appl. No. 10/453,172, filed on Jun. 3, 2003, Escrig et al.

* cited by examiner

*Primary Examiner*—Wayne A. Langel
(74) *Attorney, Agent, or Firm*—Ladas & Parry LLP

(57) ABSTRACT

In this invention, a process to obtain hydrogen peroxide solutions by means of the direct reaction of hydrogen and oxygen in the presence of a solvent and of catalysts constituted from noble or semi-noble metals, or combinations of several of these metals, supported on a halogen-free acid resin, is described.

18 Claims, No Drawings

PROCESS TO OBTAIN HYDROGEN PEROXIDE

FIELD OF THE INVENTION

The invention refers to a process to obtain a hydrogen peroxide solution by means of a direct reaction of hydrogen and oxygen in the presence of a solvent and of a catalyst comprising, at least, a noble or semi-noble metal supported on a halogen-free acid resin.

BACKGROUND OF THE INVENTION

Hydrogen peroxide is a highly important commercial product widely used as a whitening agent in the textile or paper industries, as a disinfectant and as a basic product of the chemical industry, e.g. in the production of peroxide compounds (sodium perborate, sodium percarbonate, metallic peroxides or percarboxylic acids) in oxidation reactions (manufacture of amine oxides), epoxidation and hydroxylation (manufacture of plasticizers and stabilizers). It is further used for cleaning surfaces in the semiconductor industry, chemical polishing of copper, tin and other copper alloy surfaces, etching electronic circuits, etc.

The industrial method currently most widely used for the production of hydrogen peroxide is the autoxidation of alkylanthrahydroquinones. This process, which is comprised of a series of phases of reduction, oxidation, extraction, purification and concentration, is very complicated which makes the investments and variable costs very high. A very attractive alternative to this process is the production of hydrogen peroxide directly from the reaction between hydrogen and oxygen in the presence of metal catalysts of the platinum group, using explosive hydrogen concentrations (U.S. Pat. Nos. 4,681,751, 4,772,458, 4,832,938, 5,338,531), outside the explosivity limit (WO 99/41190, WO 01/05498, WO 01/05501, U.S. Pat. No. 6,168,775 B1). However, a high concentration of $H^+$ and $Br^-$ ions is necessary in this process in the reaction medium to obtain high concentrations of hydrogen peroxide. Those ions are obtained from strong acids, such as sulphuric, phosphoric, hydrochloric or nitric and inorganic bromides. Nevertheless, working with high acid concentration solutions requires the use of special equipment to avoid corrosion. Furthermore, the presence of acid solutions and halogenated ions favours the solution of active metals (platinum group) which causes, firstly, the deactivation of the catalyst and, due to the very low dissolved metals concentration, its recovery is non-viable.

To avoid these inconveniences alternative processes have been proposed without the presence of halogen ions and/or acids in the reaction medium. For example, in the European patent no. EP 492064, a palladium based catalyst supported on a resin functionalized with halogens is proposed. The reaction medium is water with a hydrogen peroxide stabilising agent, but the $H_2O_2$ concentrations reached were only around 0.58% in weight. Another alternative (EP 504741), is the use of palladium catalysts supported on superacid inorganic solids, such as molybdenum, zirconium or wolfram, however, the hydrogen peroxide concentration reached did not exceed 1% in weight. In the European patent EP 978316, a process to obtain hydrogen peroxide solutions using palladium catalysts supported on active carbon functionalized with sulphonic groups is described. Nevertheless, said method requires many stages, it is very complicated to control the quality of the initial active carbons and the catalysts are difficult to reproduce.

Thus, there is the necessity to have new catalysts available which permit obtaining hydrogen peroxide by means of a direct reaction with hydrogen and oxygen in the presence of said catalysts, easily preparable and reproducible, and of a solvent, to obtain high concentration non-corrosive hydrogen peroxide solutions with high selectivity.

SUMMARY OF THE INVENTION

An objective of this invention is to provide a process to obtain hydrogen peroxide solutions by means of a direct reaction with hydrogen and oxygen in the presence of a solvent and a catalyst that comprises a supported noble or semi-noble metal, that resolves completely or partly the previously mentioned inconveniences in relation to the state of the art processes.

The inventors have observed that said objective can be achieved using a catalyst comprising, at least, a noble or semi-noble metal supported on a resin that (i) contains, at least, one functional acid group and (ii) is halogen-free. A process such as that provided for this invention permits obtaining high concentration non-corrosive hydrogen peroxide solutions with high hydrogen selectivity.

DETAILED DESCRIPTION OF THE INVENTION

This invention refers to a process to obtain a hydrogen peroxide solution by means of the direct reaction of hydrogen and oxygen in the presence of a solvent and a catalyst comprising, at least, a noble or semi-noble metal supported on an halogen-free acid resin.

The process in accordance with this invention uses catalysts comprising, at least, a noble or semi-noble metal supported on a halogen-free acid resin, unlike the process described in the patent EP 492064, which describes the use of palladium catalysts supported on resin functionalized with halogens. The inventors, surprisingly, have discovered that using catalysts comprising, at least, a noble or semi-noble metal supported on a halogen-free acid resin and using the reaction conditions described herein can obtain non-corrosive hydrogen peroxide solutions, with high concentration (e.g. equal to or above 1% in weight, preferably equal to or above 3% in weight, more preferably equal to or above 5% in weight) and high hydrogen selectivity (e.g. equal to or above 50%) by direct reaction between hydrogen and oxygen.

The support employed in the catalysts used in the process of this invention includes a resin functionalized with halogen-free acid groups. The resins used in this invention are formed by the reaction of homopolymerization of monomers or by the copolymerization of two or more monomers. By way of an illustration, said resin includes styrenic, acrylic, metacrylic polymers, or styrene-divinylbenzene copolymers. These resins can be functionalized with different types of acid groups such as sulphonic, carboxylic, dicarboxylic, etc. (Encyclopedia of Chemical Technology Kirk-Othmer $3^{rd}$ Edition, Vol. 13, p.678–705, Wiley-Interscience, John Wiley and Sons, 1981). Furthermore, the resins used in this invention may have an inorganic part, in such a manner that the resins can be deposited on the surface of an inorganic solid. These resins can be easily obtained at an industrial level. It would be convenient to indicate whether said resins are commercial products or, alternatively, to include a bibliographic reference where the possible acquirement of said resins are described.

In a specific embodiment, said halogen-free resin is a sulphonated styrene and divinylbenzene copolymer.

The catalyst is prepared by adding a noble or semi-noble metal belonging to groups VII to XI of the periodic table, preferably palladium, platinum, silver, gold, rhodium, iridium, ruthenium, osmium, or a mixture of 2 or more of these metals, to the support (non-halogenated acid resin). Amongst those preferred are palladium or a mixture of palladium with another metal, e.g. platinum. The quantity of metal supported can be between 0.001% and 10% in weight with respect to the support, preferably between 0.1% and 5% in weight with respect to the support. The addition of metal can be performed using any of the known preparation techniques of supported metal catalysts, such as, e.g. impregnation, adsorption, ionic exchange, etc. For the impregnation, one can use any kind of organic or inorganic salt of the metal to be impregnated, that is soluble in the solvent used in the addition of the metal, such as acetate, nitrate, halide or oxalate, etc.

Hydrogen peroxide formation is carried out by means of a direct reaction between hydrogen and oxygen within a solvent in the presence of a catalyst and, optionally, with the addition of an inert gas. Nitrogen, carbon dioxide, helium, argon, etc, can be used as inert gases. The working pressure is normally above atmospheric pressure, and preferably between 2 and 30 MPa. The molar relation between hydrogen and oxygen ranges from 1/1 to 1/100. The hydrogen concentration in the gas phase in contact with the reaction medium should preferably be below 4.16% molar, to maintain the operation outside the explosivity limits of the hydrogen and oxygen mixtures.

The solvents that can be used in this invention are those compounds with an inert character in the operation conditions during the formation of hydrogen peroxide by direct reaction between hydrogen and oxygen. As solvents, in the framework of this invention, one can state water, $C_1$–$C_{12}$ alcohols, $C_1$–$C_{12}$ glycols or their mixtures. As regards alcohols, one can use aliphatic alcohols such as methanol, ethanol, 1-propanol, 2-propanol, 1-butanol, 2-butanol, 2-methyl-2-propanol, 2-methyl-1-propanol, 1-pentanol, etc.; cycloaliphatic alcohols such as cyclohexanol, cyclooctanol, etc.; and aromatic alcohols such as 1-phenylethanol, 2-phenylethanol,etc. As regards glycols, ethylene glycol, propylene glycol, diethylene glycol, dipropylene glycol, triethylene glycol, tripropylene glycol, etc. can be used.

The reaction of oxygen with hydrogen is performed at temperatures ranging from –10° C. to 100° C., preferably from 10° C. to 75° C.

The process of this invention can be carried out continuously, semi-continuously or discontinuously, by conventional techniques, e.g. in a stirred tank reactor with suspended catalyst particles, in a basket type stirred tank reactor, etc. Once the reaction has reached the desired conversion levels, the catalyst can be separated by different known procedures, such as, e.g. by filtration if the suspended catalyst is used, which would permit its subsequent reutilization. In this case, the quantity of catalyst used corresponds to that necessary to obtain a 0.01% to 10% concentration in weight with respect to the solvent and preferably between 0.1% and 5% in weight.

The reaction can be performed, likewise, in a fixed bed reactor, in accordance with known procedures. For this, the solvent and gaseous current of oxygen and hydrogen are made to circulate over the catalyst bed, in the presence of an inert gas (or not) in parallel or in counterflow in the above-mentioned temperature and pressure conditions.

The reaction to obtain hydrogen peroxide in accordance with this invention can be performed, if desired, in the presence of a promoter to improve the $H_2O_2$ yield. These promoters, which in general are composed of halogens, can be, e.g. bromide compounds such as hydrobromic acid, sodium bromide, potassium bromide or ammonium bromide, or chlorine compounds such as hydrochloric acid, sodium chloride, potassium chloride or ammonium chloride. The quantity of promoter used, in this case, to put this invention into practise is not critical and can range from $10^{-7}$ and $10^{-2}$ moles per liter, preferably between $10^{-6}$ and $10^{-4}$ moles per liter.

If desired, a hydrogen peroxide stabilising agent can be added to the reaction medium. As hydrogen peroxide stabilising agents, one can quote inorganic acids such as phosphoric acid, sulphuric acid, nitric acid, etc.; organic acids such as aminomethylenephosphoric acid etc.; amino acids such as leucine, etc.; phosphoric acid salts such as sodium pyrophosphate, etc.; chelating agents such as ethylenediaminetetraacetic acid (EDTA), etc.; surfactant agents such as alkylbenzyl sulphonates, etc. These stabilisers can be used individually or in mixtures of two or more of them. The preferred stabilisers in this invention are aminomethylenephosphoric acid, 1-hydroxyethylene-1,1-diphosphoric acid, ethylenediaminotetramethylene-phosphoric acid, the sodium salts of said compounds and sodium pyrophosphate. The stabiliser concentration depends on the type of stabiliser and hydrogen peroxide concentration. However, it is preferable to maintain the stabiliser concentration sufficiently low enough to avoid the catalyst metal from dissolving and/or the corrosion of the reactor used. In general, the quantity of stabiliser added is less than 0.5% in weight with respect to the solvent and preferably below 500 ppm.

The following examples serve to illustrate the invention and should not be considered as limits of its scope.

EXAMPLES

Examples 1 to 3 illustrate the preparation of a catalyst according to the invention, whilst Examples 4 to 8 illustrate obtaining hydrogen peroxide solutions according to the invention.

Example 1

A catalyst was prepared from a commercial resin functionalized with sulphonic groups, Lewatit K2621® (Bayer AG) (non-halogenated macroporous resin, with an exchange capacity of 1.4 eq/l, pore diameter 70 nm, porosity 0.6 ml/g and a specific surface area BET 40 $m^2$/g). Firstly, the resin is washed three times with acetone, using equal volumes of solvent and resin. Next, a resin suspension (4 g) is prepared with 50 ml of methanol. To this suspension, a palladium (II) acetate solution (86 mg) in acetone (20 ml) is added drop by drop. The suspension is concentrated to half the solvent in a rotative evaporator under vacuum, the temperature of the bath was 45° C. The solution was filtered and the solid obtained was washed and air-dried at 110° C. for 2 hours. The palladium content was of 1.34% in weight.

Example 2

A catalyst was prepared from a commercial resin functionalized with sulphonic groups Lewatit K2641® (Bayer AG) (non-halogenated macroporous resin, with an exchange capacity of 4.8 eq/l, pore diameter 70 nm, porosity 0.3 ml/g and a specific surface area BET 35 $m^2$/g). Firstly, the resin is washed three times with acetone, using equal volumes of solvent and resin. Next, a resin suspension (4 g) is prepared with 50 ml of methanol. To this suspension, a palladium (II) acetate solution (86 mg) in acetone (20 ml) is added drop by drop. The suspension is concentrated to half of the solvent in a rotative evaporator under vacuum, the temperature of the bath was 45° C. The solution was filtered and the solid obtained was washed and air-dried at 110° C. for 2 hours. The palladium content was of 1.49% in weight.

Example 3

A catalyst was prepared from a commercial resin functionalized with sulphonic groups Lewatit K2621® (Bayer AG) (non-halogenated macroporous resin, with an exchange capacity of 1.4 eq/l, pore diameter 70 nm, porosity 0.6 ml/g and a specific surface area BET 40 m$^2$/g). Firstly, the resin is washed three times with acetone, using equal volumes of solvent and resin. Next, a resin suspension (4 g) is prepared with 50 ml methanol. To this suspension, a palladium (II) acetate solution (86 mg) and tetra-amine platinum (II) nitrate solution (12 mg) in acetone (20 ml) is added drop by drop. The suspension is concentrated to half of the solvent in a rotative evaporator under vacuum, the temperature of the bath was 45° C. The solution was filtered and the solid obtained was washed and air-dried at 110° C. for 2 hours. The palladium content was of 1.37% in weight and the platinum content was of 0.15% in weight.

Example 4

1.6 g of the catalyst from Example 1 were put inside an autoclave with 150 ml of a methanol:water mixture (96:4) and 24 ppm of HBr, and the mixture was stabilised at 40° C. The system was pressurised with a $H_2$:$O_2$: $N_2$ (2:48:50) mixture with a flow of 2,500 mlN/min to 10 MPa(a) without stirring, and the stirring was started up (1,500 rpm) to initiate the reaction. After 2 h of the reaction a hydrogen peroxide concentration of 5.3% in weight was reached. The hydrogen selectivity was of 76%.

Example 5

0.8 g of the catalyst from Example 1 were put inside an autoclave with 150 ml of a methanol:water mixture (96:4) and 12 ppm of HBr, and the mixture was stabilised at 40° C. The system was pressurised with a $H_2$:$O_2$:$N_2$ (2:48:50) mixture with a flow of 2,500 mlN/min to 10 MPa(a) without stirring, and the stirring was started up (1,500 rpm) to initiate the reaction. After 2 h of the reaction a hydrogen peroxide concentration of 4.9% in weight was reached. The hydrogen selectivity was of 72%.

Example 6

0.8 g of the catalyst from Example 2 were put inside an autoclave with 150 ml of a methanol:water mixture (96:4) and 12 ppm of HBr, and the mixture was stabilised at 40° C. The system was pressurised with a $H_2$:$O_2$:$N_2$ (2:48:50) mixture with a flow of 2,500 mlN/min to 10 MPa(a) without stirring, and the stirring was started up (1,500 rpm) to initiate the reaction. After 2 h of the reaction a hydrogen peroxide concentration of 5.8% in weight was reached. The hydrogen selectivity was of 77%.

Example 7

0.8 g of the catalyst from Example 2 were put inside an autoclave with 150 ml of a isobutanol:water mixture (96:4) and 12 ppm of HBr, and the mixture was stabilised at 40° C. The system was pressurised with a $H_2$:$O_2$ (3.6:96.4) mixture with a flow of 2,500 mlN/min to 5 MPa(a) without stirring, and the stirring was started up (1,500 rpm) to initiate the reaction. After 1 h of the reaction a hydrogen peroxide concentration of 1.4% in weight was reached. The hydrogen selectivity was of 58%.

Example 8

0.8 g of the catalyst from Example 3 were put inside an autoclave with 150 ml of a methanol:water mixture (96:4) and 6 ppm of HBr, and the mixture was stabilised at 40° C. The system was pressurised with a $H_2O_2$:$N_2$ (2:48:50) mixture with a flow of 2,500 mlN/min to 10 MPa(a) without stirring, and the stirring was started up (1,500 rpm) to initiate the reaction. After 2 h of the reaction a hydrogen peroxide concentration of 5.0% in weight was reached. The hydrogen selectivity was of 74%.

The invention claimed is:

1. A process to obtain a hydrogen peroxide solution, wherein the process comprises reacting hydrogen and oxygen in the presence of a solvent and a catalyst consisting essentially of one metal or a mixture of metals supported on a halogen free acid resin, selected from the group consisting of metals of groups VII to XI of the periodic table.

2. The process according to claim 1, in which said one metal or a mixture of metals are selected from the group consisting of palladium, platinum, silver, gold, rhodium, iridium, ruthenium, osmium, and mixtures thereof.

3. The process according to claim 2, in which said metal or a mixture of metals include palladium or a mixture of palladium with platinum.

4. The process according to claim 1, in which the quantity of metal in said catalyst ranges from 0.001% to 10% in weight with respect to the acid resin.

5. The process according to claim 1, wherein the acid resin is a sulphonated styrene and divinylbenzene copolymer.

6. The process according to claim 1, in which said solvent is selected from the group consisting of water, $C_1$–$C_{12}$ alcohols, $C_1$–$C_{12}$ glycols, and mixtures thereof.

7. The process according to claim 1, in which the reaction temperature between the hydrogen and the oxygen in the presence of the solvent and the catalyst ranges from −10° C. to 100°C.

8. The process according to claim 1, in which the reaction between the hydrogen and the oxygen in the presence of the solvent and the catalyst is carried out at a pressure above atmospheric pressure, optionally in the presence of an inert gas, and with a molar relation between the hydrogen and the oxygen in a gas phase ranging from 1/1 to 1/100.

9. The process according to claim 1, which further comprises adding a promoter for forming hydrogen peroxide and/or a hydrogen peroxide stabilizing agent.

10. The process according to claim 1, in which the quantity of metal in said catalyst ranges from 0.1% to 5% in weight with respect to the acid resin.

11. The process according to claim 1, in which the reaction temperature between the hydrogen and the oxygen in the presence of the solvent and the catalyst ranges from 10° C. to 75°C.

12. The process according to claim 1, in which the reaction between the hydrogen and the oxygen in the presence of the solvent and the catalyst is carried out at a pressure between 2 and 30 MPa, optionally in the presence of an inert gas, and with a molar relation between the hydrogen and the oxygen in a gas phase ranging from 1/1 to 1/100.

13. The process according to claim 2, wherein said acid resin is a sulphonated styrene and divinylbenzene copolymer.

14. The process according to claim 3, wherein acid resin is a sulphonated styrene and divinylbenzene copolymer.

15. The process according to claim 4, wherein said acid resin is a sulphonated styrene and divinylbenzene copolymer.

16. The process according to claim 6, wherein said acid resin is a sulphonated styrene and divinylbenzene copolymer.

17. The process according to claim 12, wherein said acid resin is a sulphonated styrene and divinylbenzene copolymer.

18. A process to obtain a hydrogen peroxide solution, wherein the process comprises reacting hydrogen and oxygen in the presence of a solvent and a catalyst consisting of one metal or a mixture of metals selected from the group consisting of metals of groups VII to XI of the periodic table wherein the catalyst is supported on a halogen-free acid resin.

* * * * *